United States Patent Office 3,787,437
Patented Jan. 22, 1974

3,787,437
2-SILYL-1-METHYL IMIDAZOLES
Sandor Barcza, West Orange, N.J., assignor to
Sandoz-Wander, Inc., Hanover, N.J.
No Drawing. Filed Feb. 14, 1972, Ser. No. 226,249
Int. Cl. C07d 49/36
U.S. Cl. 260—309      7 Claims

ABSTRACT OF THE DISCLOSURE

Substituted 2-silyl-1-methyl imidazoles, e.g., 2-(phenyl-dimethyl)silyl-1-methyl imidazole, are prepared by reacting substituted silyl halides with metalated imidazole, and are useful by reason of their pharmacological activity in animals, e.g. as sedative-hypnotics.

---

This application relates to novel silane derivatives which are useful as sedative-hypnotic agents. In particular, it relates to phenyl and/or alkyl substituted 2-silyl-1-alkyl-imidazoles and to processes for their preparation.

The compounds of this invention may be represented by the following formula:

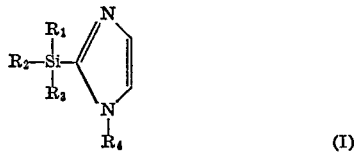

(I)

where
$R_1$, $R_2$ and $R_3$ each independently represent alkyl having 1 to 4 carbon atoms, e.g. methyl, ethyl and isopropyl or phenyl which may be substituted with 1 or 2 alkyl groups of 1 to 4 carbon atoms and
$R_4$ represents alkyl of 1 to 4 carbon atoms, and pharmaceutically acceptable acid addition salts thereof.

The compounds of Formula I may be prepared in accordance with the following reaction scheme:

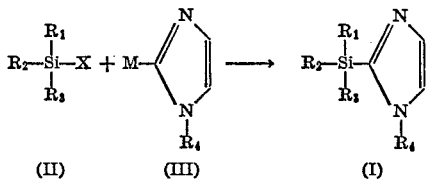

where
$R_1$, $R_2$, $R_3$ and $R_4$ are as defined above
M is an alkali metal, e.g., lithium, sodium, an alkaline earth metal, e.g., calcium or —MgY and
X and Y are independently halo having an atomic weight of about 19 to 127, preferably 35 to 127.

The compounds of Formula (I) are prepared by treating a compound of Formula II with a compound of Formula III in an inert solvent and atmosphere. It is preferred that the reaction be carried out in an aprotic solvent such as aliphatic or aromatic hydrocarbons, for example, hexane, heptane, benzene, toluene or xylene, and especially in polar aprotic solvents, e.g. glyme, diglyme, diethyl ether, dioxane or tetrahydrofuran. The preferred inert gases are nitrogen, argon or helium. The temperature of the reaction is not critical and can be carried out between about —70° C. and the reflux temperature of the system. The product (I) is recovered by conventional techniques, e.g., distillation, extraction and crystallization. The time of the reaction is also not critical but for optimum results the reaction should be run for about 5 to 48 hours.

Those compounds of Formula II wherein X is bromine or iodine are more desirable from the standpoint of being more reactive. However, the chlorides are quite satisfactory in their reactivity and have the advantage of being more readily available. Many of the compounds of Formula II are known and may be prepared by methods described in the literature. The compounds of Formula II not specifically disclosed may be prepared by analogous methods using known starting materials.

The preferred compounds of Formula III are those in which M is lithium. The compounds of Formula III may be prepared by methods described in the literature. For example, they may be prepared by reacting a suitable 1-alkyl-imidazole, such as 1-methyl-imidazole, with a lower alkyl alkali metal, e.g. butyl lithium, or other base, such as lithium hydride, sodium hydride or phenyl lithium, in an inert solvent at a temperature of about —70° C. to +30° C. This metalation reaction can be accelerated somewhat by first reacting the base with a complexing agent such as tetramethyl ethylene diamine or other tertiary amine or diaza bicyclooctane. The advantage of this step asserts itself to a greater degree the larger the alkyl group on the 1-alkyl imidazole.

Compounds of Formula I also form non-toxic pharmaceutically acceptable acid addition salts. Such salts are prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate, maleate, malate, tartrate, methanesulfonate, cyclohexylsulfamate and the like.

The compounds of Formula I and their acid addition salts are useful because they possess pharmacological activity in animals. In particular, the compounds I are useful as sedative-hypnotic agents as indicated, for example, by behavior tests in mice (50-200 mg./kg. i.v.), by an inhibition of N-sulfamoydazepine-evoked tonic convulsions in mice (50-200 mg./kg. i.v.) and also by a reinduction of hexobarbital anesthesia in mice (50-200 mg./kg. i.v.) in a modification of the method reported by Winter (J. Pharmacol. and Exp. Therap. 94:7, 1948). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about 5 milligrams to about 200 milligrams per kilogram of body weight, at bedtime or in divided doses 2 to 4 times a day or in sustained release form. For most large mammals the administration of from about 350 milligrams to about 2000 milligrams of the compound per day provides satisfactory results and dosage forms suitable for internal administration comprise from about 90 milligrams to about 1000 milligrams of the compound in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules preferably contain the active ingredient admixed with an inert solid diluent, e.g. calcium carbonate, calcium phosphate and kaolin. The preferred pharmaceutical compositions from the standpoint of preparation and ease of administration are solid compositions, particularly solid diluent-filled capsules and tablets.

Representative formulations of a tablet and a capsule prepared by conventional techniques are as follows:

| Ingredient | Weight Tablet | Capsule |
|---|---|---|
| 2-(phenyldimethyl)silyl-1-methyl-imidazole | 90 | 90 |
| Tragacanth | 10 | |
| Lactose | 157.5 | 210 |
| Corn starch | 25 | |
| Talcum | 15 | |
| Magnesium stearate | 2.5 | |

The following examples illustrate the invention.

EXAMPLE 1

2-(phenyldimethyl)silyl-1-methyl-imidazole

Under nitrogen 218.7 ml. (350 millimoles) of 1.6 molar n-butyl lithium solution in n-hexane is cooled to 0° C. then 44.7 g. (385 millimoles) of tetramethylethylene diamine is injected with stirring. The mixture is cooled in a bath at −70° C. and 100 ml. of absolute ether is added, followed by dropwise addition of 28.7 g. (350 millimoles) of 1-methylimidazole. A thick precipitate forms. The slurry is allowed to warm to room temperature and then recooled to −70°. 59.68 g. (350 millimoles) of phenyldimethylchlorosilane is added dropwise, together with 100 ml. more of absolute ether to allow stirring. The mixture is again allowed to warm to room temperature, further stirred for 1 hour and then refluxed overnight. The white precipitate is filtered off (LiCl), benzene (500 ml.) is added to the filtrate which is then washed with four 250 ml. portions of water, dried with magnesium sulfate and concentrated. A yellow oil is obtained which on being fractionally distilled at 0.1 mm. Hg gives clear colorless product boiling between 122° and 126° C.

EXAMPLE 2

2-trimethylsilyl-1-methyl-imidazole

Under nitrogen 28.7 g. (350 millimoles) of 1-methylimidazole in 350 ml. of absolute tetrahydrofuran is cooled to −70° C. Via syringe 218.7 ml. (350 millimoles) of 1.6 M n-butyl lithium in hexane is added. The stirred mixture is allowed to warm to room temperature during 2 hours. It is recooled to −70° C. and 38.01 g. (350 millimoles) of trimethylchlorosilane is added. The mixture is again allowed to warm to room temperature as precipitate slowly forms. Stirring at about 25° C. is continued for 2 days. The precipitate is filtered off, the THF removed from the filtrate in vacuo and 250 ml. of benzene added to the filtrate. The solution is washed with three portions of water, dried over magnesium sulfate and concentrated to a yellow oil which on fractionation at 0.1 mm. Hg yields the product as a colorless oil, boiling point 45°–50° C.

EXAMPLE 3

2-triphenylsilyl-1-methyl-imidazole

To 55.68 ml. (200 millimoles) of 23% n-butyl lithium in benzene at 0° C. under nitrogen is added 25.56 g. (200 millimoles) of tetramethylethylenediamine, and the solution is cooled in a bath at −70° C. Absolute ether (100 ml.) is added, followed by 16.4 g. (200 millimoles) of 1-methyl-imidazole dropwise, with stirring. After warming to room temperature the mixture is recooled to −70° C., and 29.6 g. (100 millimoles) of triphenylchlorosilane is added in 100 ml. of absolute ether. The mixture is warmed up and refluxed overnight. A white precipitate is filtered off. The filtrate is combined with 300 ml. of benzene, washed four times with water, dried (MgSO₄) and concentrated. Stirring of the pumped concentrate with 100 ml. of acetone gives 2-triphenylsilyl-1-methyl-imidazole. The white precipitate is stirring with chloroform, filtered, and the filtrate concentrated. Stirring this concentrate with 100 ml. of acetone yields additional 2-triphenylsilyl-1-methyl-imidazole.

Equimolar amounts of picric acid (2,4,6 - trinitrophenol) and 2-triphenylsilyl-1-methyl-imidazole, each dissolved in the minimum amount of dry benzene, are combined. The resultant precipitate is recrystallized from toluene containing a little acetonitrile yielding 2-triphenylsilyl-1-methyl-imidazole picrate, M.P. 205.5°–206° C.

What is claimed is:

1. A compound selected from the group consisting of compounds of the formula

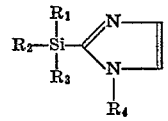

where $R_1$, $R_2$ and $R_3$ each, independently, represent alkyl of 1 to 4 carbon atoms or phenyl which may be mono- or di-substituted with alkyl of 1 to 4 carbon atoms; and $R_4$ represents alkyl of 1 to 4 carbon atoms, and their pharmaceutically acceptable acid addition salts.

2. A compound of claim 1 wherein $R_4$ is methyl.
3. The compound of claim 2 wherein $R_1$, $R_2$ and $R_3$ are phenyl.
4. The compound of claim 2 wherein $R_1$, $R_2$ and $R_3$ are methyl.
5. A compound of claim 1 wherein $R_1$ and $R_2$ are alkyl and $R_3$ is phenyl.
6. A compound of claim 2 wherein $R_1$ and $R_2$ are alkyl and $R_3$ is phenyl.
7. The compound of claim 6 wherein $R_1$ and $R_2$ are methyl.

References Cited

FOREIGN PATENTS 1,940,628   2/1971   Germany _____ 260—309

OTHER REFERENCES

Barcza Chem. Abst., vol. 78, No. 4369e (1973).
Brikofer et al., Chem. Abst. vol. 58, column 5724 (1963).
Brittain Chem. Abst., vol. 72, No. 56964 (1970).
Smith et al. Chem. Abst., vol. 72, No. 39637z (1970).

NATALIE TROUSOF, Primary Examiner

U.S. Cl. X.R.

424—184